United States Patent
Cevasco et al.

(12)

(10) Patent No.: US 6,648,514 B2
(45) Date of Patent: Nov. 18, 2003

(54) SLEEVE BEARING ASSEMBLY SYSTEM AND METHOD

(75) Inventors: James J. Cevasco, Simpsonville, SC (US); Alexander R. Diaz, Greer, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/967,011

(22) Filed: Sep. 28, 2001

(65) Prior Publication Data

US 2003/0063826 A1 Apr. 3, 2003

(51) Int. Cl.[7] .............................................. F16C 33/02
(52) U.S. Cl. ........................ 384/281; 384/441; 384/537
(58) Field of Search ................................. 384/281, 280, 384/441, 428, 537

(56) References Cited

U.S. PATENT DOCUMENTS 4,728,202 A  *  3/1988  LaRou ......................... 384/537
5,897,214 A  *  4/1999  Nisley ......................... 384/537

* cited by examiner

*Primary Examiner*—Lenard A. Footland
(74) *Attorney, Agent, or Firm*—Patrick S. Yoder; Alexander M. Gerasimow; William R. Walbrun

(57) ABSTRACT

A sleeve bearing system is provided in which wear is reduced and thrust loading capabilities are offered. An inner ring is secured tightly to a rotating member via a collar. The inner ring forms a plain or sleeve bearing with a bearing set. The bearing set may be supported within a housing designed to be fitted to a machine frame. A thrust extension of the bearing set interfaces with the collar to transmit thrust loading on the rotating member to the bearing set and housing via the inner ring and collar.

36 Claims, 3 Drawing Sheets

SLEEVE BEARING ASSEMBLY SYSTEM AND METHOD

BACKGROUND OF THE INVENTION

The present invention relates generally to the field of bearing assemblies. More particularly, the invention relates to a novel system for mounting and interfacing a plain or sleeve bearing assembly on a shaft or other mechanical component.

In the field of bearings, a wide variety of structures and techniques are known and are commonly in use. Such assemblies include both plain or sleeve bearings, and bearings incorporating bearing elements, such as rollers, balls, and so forth. In the former type, two bearing elements are brought together and rotate with respect to one another without separate bearing elements interposed therebetween. Such bearings are common in a number of applications, typically where loads are somewhat reduced as compared to applications for roller or ball bearings.

In sleeve bearing assemblies of certain known types, a bearing assembly is supported within a housing. The housings may be of any conventional style, such as pillow block styles, two and four bolt flange styles, and so forth. The bearing assembly includes an inner housing and an inner sleeve. The inner sleeve is snapped or press fit within the inner housing. In certain models, the inner sleeve may be made of a non-metallic material, such as a polymer, graphite, carbon, and so forth. A rotating member is supported within the inner sleeve and the interface between the inner sleeve and the rotating member constitutes the bearing interface of the assembly.

In conventional applications for sleeve bearings of the type described above, a shaft, hub, or similar rotating element is slid within the inner sleeve during installation, and rotates directly within the inner sleeve during use. A lubricating medium may be provided at the interface, or the qualities of the inner sleeve itself may provide sufficient friction reducing properties.

While bearing assemblies of the type described above are sufficient in many applications, there are not without drawbacks. For example, where an inner sleeve of a sleeve bearing assembly is interfaced directly with a shaft or other rotating element, chaffing, wear and similar degradation can occur both to the inner sleeve and to the rotating member. Such degradation is particularly troubling on shafts of machinery, due to the eventual need to disassemble the machinery and replace the shaft when the degradation becomes sufficiently advanced. In many applications, the degradation may be caused by walking, fretting or other marring of the shaft due to the direct contact with the inner sleeve of the bearing assembly.

Another problem with sleeve-type bearings has been their inability to withstand thrust loading. Depending upon the bearing configuration and its materials of construction, such thrust loading may need to be avoided completely or substantially limited due to the potential for deforming the bearing elements or rapidly degrading the bearing integrity. This is particularly the case where the inner sleeve of the bearing assembly is made of a non-metallic substance, such as a polymer.

There is a need, therefore, for an improved bearing system capable of avoiding wear to a supported and rotating member, and able to withstand higher degrees of thrust loading. There is a particular need for an improved bearing system which is simple to install and which can be based upon existing styles and configurations of bearings and bearing housings.

SUMMARY OF THE INVENTION

The present invention provides an improved bearing system designed to respond to such needs. The system is particularly well-suited to a plain or sleeve bearing assemblies. The system may be adapted for sleeve bearings having a variety of construction materials including graphite, carbon, babbitt, bronze, and other metals, and is particularly well-suited to bearing assemblies employing a polymeric inner sleeve. The system may be employed with a variety of rotating elements, including shafts, hubs, rollers, and so forth. It should be noted that while in the present description references is made to a rotating element supported within the bearing, the present system may be used in situations where a central element, such as a shaft, supports a rotating element disposed about it, such as roller, pulley, or the like.

The present technique is based upon the use of an inner ring designed to interface between an inner sleeve of a bearing assembly and a central machine element. Again, the central machine element may typically be a rotating shaft. The inner sleeve and inner ring define a bearing interface therebetween. The inner ring preferably includes a series of longitudinal slots or slits such that radial contraction of the inner ring is available during installation. A collar is fitted to the inner ring and secures the inner ring to the central element or shaft. The bearing assembly may be of any suitable design and style, including plain or sleeve bearings having polymeric inner sleeves. In a present design, the bearing assembly includes an inner sleeve and an inner housing which are press fit to one another. The inner housing may be mounted within a conventional bearing housing, such as a housing having a spherical support surface allowing for some axial misalignment of the rotating element.

The provision of the bearing interface between the inner ring and the inner sleeve of the sleeve bearing affords localization of any wear at the inner ring or the inner sleeve. Thus, fretting, marring, and other degradation of the shaft are avoided. Moreover, the collar, in conjunction with a thrust extension of the inner sleeve provides for thrust loading of the bearing assembly. The overall assembly then affords both limitation of wear on a supported machine element, as well as the resistance to thrust loading.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
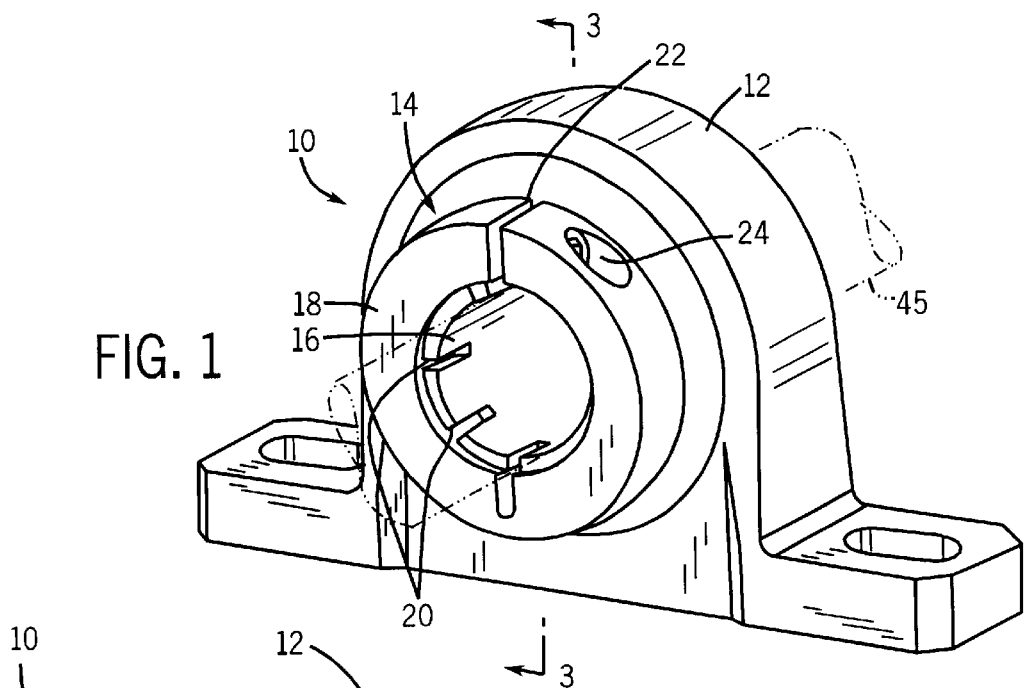
FIG. 1 is a perspective view of a bearing assembly in accordance with certain aspects of the present technique including a housing and mounted sleeve, ring and collar.

Turning now to the drawings, and referring first to FIG. 1, a bearing assembly is illustrated incorporating features of present technique. In the illustrated embodiment, bearing assembly 10 includes a housing 12 which receives and supports a sleeve or plain bearing set 14. In the embodiment illustrated in FIG. 1, housing 12 is a polymeric outer housing incorporating a structural foam which is molded to create the pillow block support shown. In applications such as the food and beverage industry, for example, corrosion resistance may be an important factor in the specification of the bearing set and housing. In the embodiment illustrated the pillow block style for housing 12 is adapted to be supported on a machine surface on which a rotating element, such as a shaft 48, illustrated in broken lines in FIG. 1, is to be mounted. It should be noted, however, that the present technique is not limited to any particular housing style. Accordingly, 4-bolt and 2-bolt flange styles may be used, as may tapped base, take-up frame styles, and so forth. Similarly, while certain applications may benefit significantly from the use of a polymeric bearing housing as illustrated, in other environments other housing materials may be substituted, including stainless steel, aluminum, plated materials, and so forth.

The bearing assembly 10 includes an inner ring 16 which is secured within the bearing set 14. The inner ring 16, as described more fully below, is securely mounted on the rotating member 48 by a collar 18 when placed in service. The inner ring preferably includes features which permit it to be constrained or contracted radially, such as a series of slits 20. As illustrated, in a present embodiment all slits are formed radially symmetrically in the inner ring and extend along a portion of the ring in a longitudinal direction. Collar 18, which is generally annular in shape, presents a split 22 which allows for its contraction over the inner ring during installation and use. In the illustrated embodiment a fastener 24 is provided in the collar, and is received within a threaded aperture (see, e.g., FIG. 2) to span the split formed in the collar. Thus, as described more fully below, during installation the collar may be placed on the extremity of the inner ring 16 bearing the slits 20, and the assembly may be tightened and contracted over the rotating member to secure the entire assembly in place.

Figure 2:
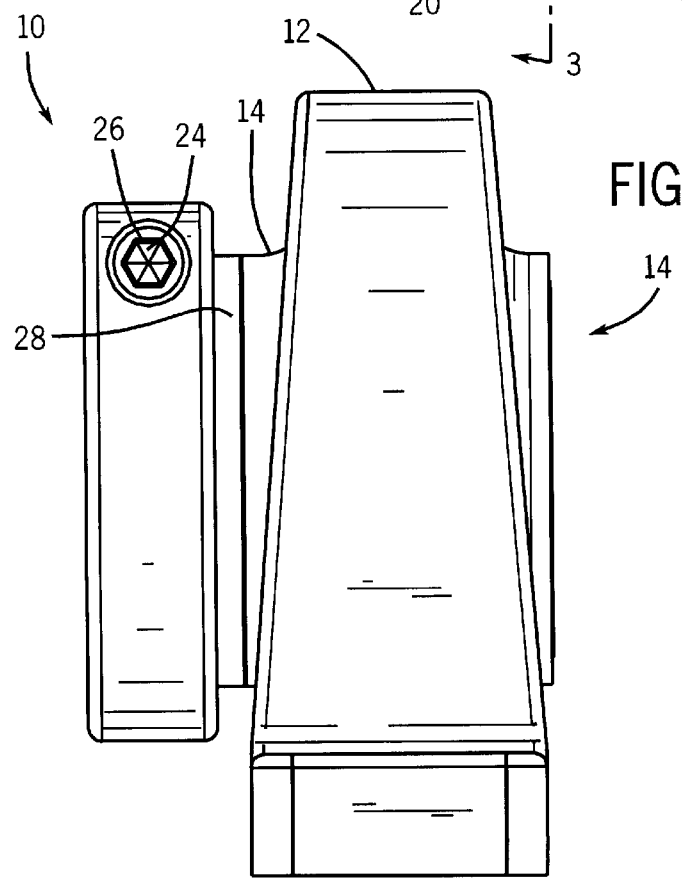
FIG. 2 is a side elevational view of the assembly of FIG. 1.

FIG. 2 illustrates a side elevation of the arrangement shown in FIG. 1. As shown in FIG. 2, the bearing set 14 extends on either side of the housing 12. As will be appreciated by those skilled in the art, depending upon the configuration of housing 12, bearing set 14 may be somewhat recessed within the housing. In the view of FIG. 2, it can be noted that in a present embodiment, bearing set 14 presents a thrust abutment 28 against which the collar 18 may ride. Thus, as discussed more fully below, in addition to providing an interface between the rotating member and the sleeve bearing set, the present technique affords resistance to thrust loading in a manner previously unavailable in such assemblies.

Figure 3:
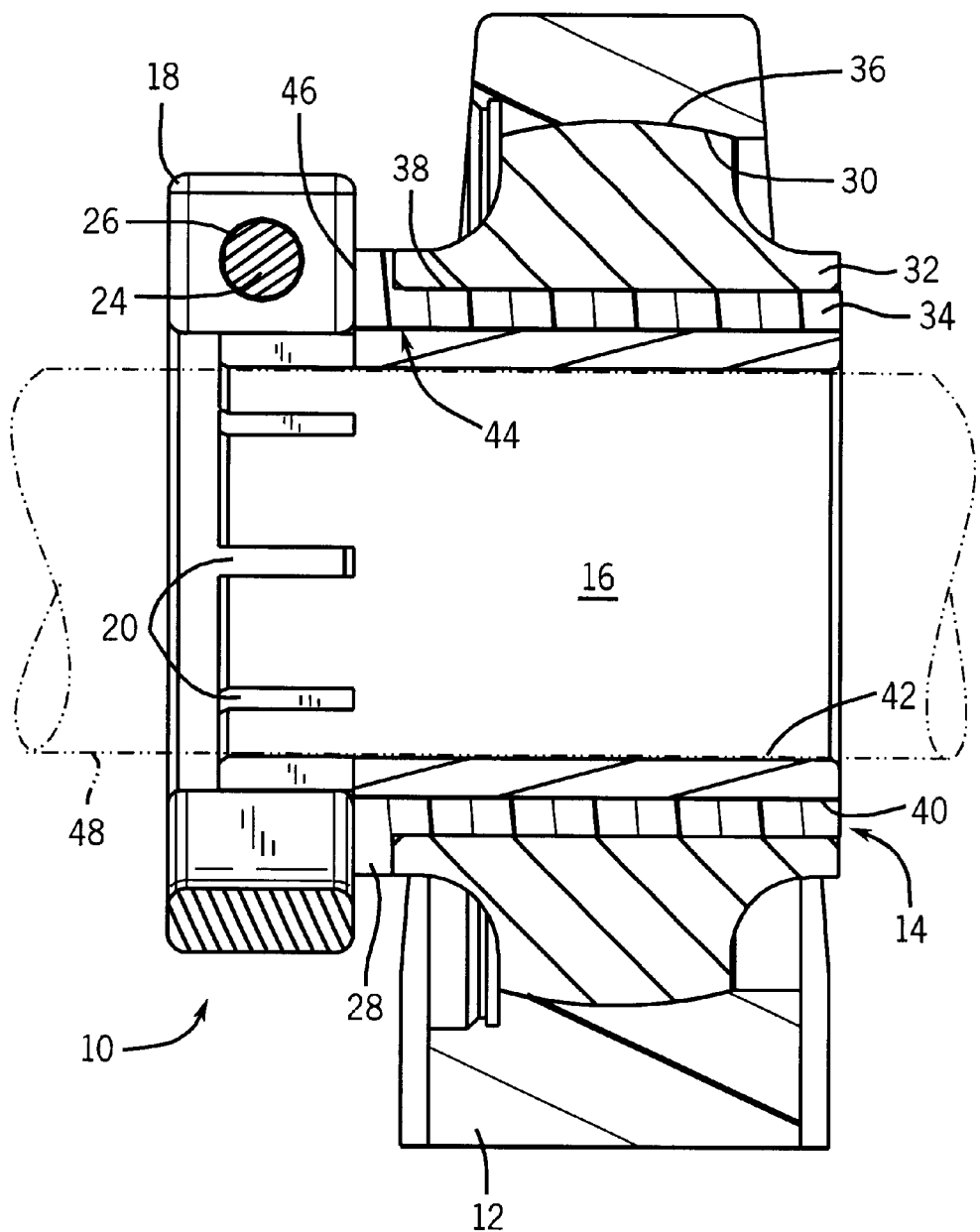
FIG. 3 is a sectional view through the assembly of FIG. 1 illustrating the various components of the system.

FIG. 3 illustrates a present configuration of the embodiment illustrated in the previous figures along section line 3—3 of FIG. 1. As shown in FIG. 3, housing 12 provides a spherical support 30 designed to receive the bearing set 14. The sleeve bearing set 14, itself, includes an inner housing 32 and an inner sleeve 34. The inner housing 32 includes an outer spherical surface 36 designed to interface with the spherical support 30 of housing 12. Thus, the bearing set, while being centered within the housing, is free to accept some degree of axial misalignment of the rotating element 48 when placed in service.

The inner housing 32 and the inner sleeve 34 are preferably pre-assembled prior to installation of the bearing assembly. The inner sleeve and inner housing meet in an interface 38 which preferably is a press fit so as to prevent rotation of the inner sleeve with respect to the inner housing.

It should also be noted that various materials of construction may be used in the embodiment shown. For example, the inner housing 32 may be a metal, such as stainless steel. Such metals are preferred in applications where corrosion resistance is desirable, such as in the food and beverage industry. In such applications, it has also been found preferable to provide a polymeric inner sleeve 34. However, certain aspects of the present technique may be employed with other types of inner sleeve, including inner sleeves made of metals, such as bronze or babbitt, as well as alternative materials such as carbon or graphite.

It has been found in a number of applications, that direct contact between inner sleeve 34 and a rotating member, such as a shaft 48, can lead to wear of the inner sleeve and the shaft. Such wear may result, in particular, from fretting or scoring of the sleeve and shaft. Where degradation of the shaft occurs, it has been found that significant costs, in terms of material, labor, and downtime, can result from replacement of the shaft following significant wear. The present technique provides inner ring 16 which is tightly secured to the rotating member so as to avoid such premature wear.

As shown in FIG. 3, inner ring 16 forms a bushing or bearing element which is disposed between the rotating member 48 and the inner sleeve 34 of bearing set 14. The inner sleeve 16 presents an outer surface 40 which is the sleeve or plain bearing surface riding rotationally against the inner surface of inner sleeve 34. Inner ring 16 further presents an inner surface 42 designed to receive and support the rotating member 48.

As noted above, the present arrangement also affords resistance to thrust loading on the rotating member and bearing set. In the embodiment illustrated in FIG. 3, an extension 44 is formed on the inner sleeve 34 of the bearing set 14. The thrust abutment 28 is an annular periphery of the extension 44 designed to fit between the inner housing 32 of the bearing set and the collar 18 of the assembly. Again, the inner sleeve 34 is designed not to rotate with respect to the inner housing 32. However, rotation does occur between the extension 44 of the inner sleeve 34 and the collar 18. Thus, a thrust interface 46 is provided which transmits thrust loading to the bearing set 14 and housing 12 through the intermediary of the inner ring 16 and collar 18.

Figure 4:
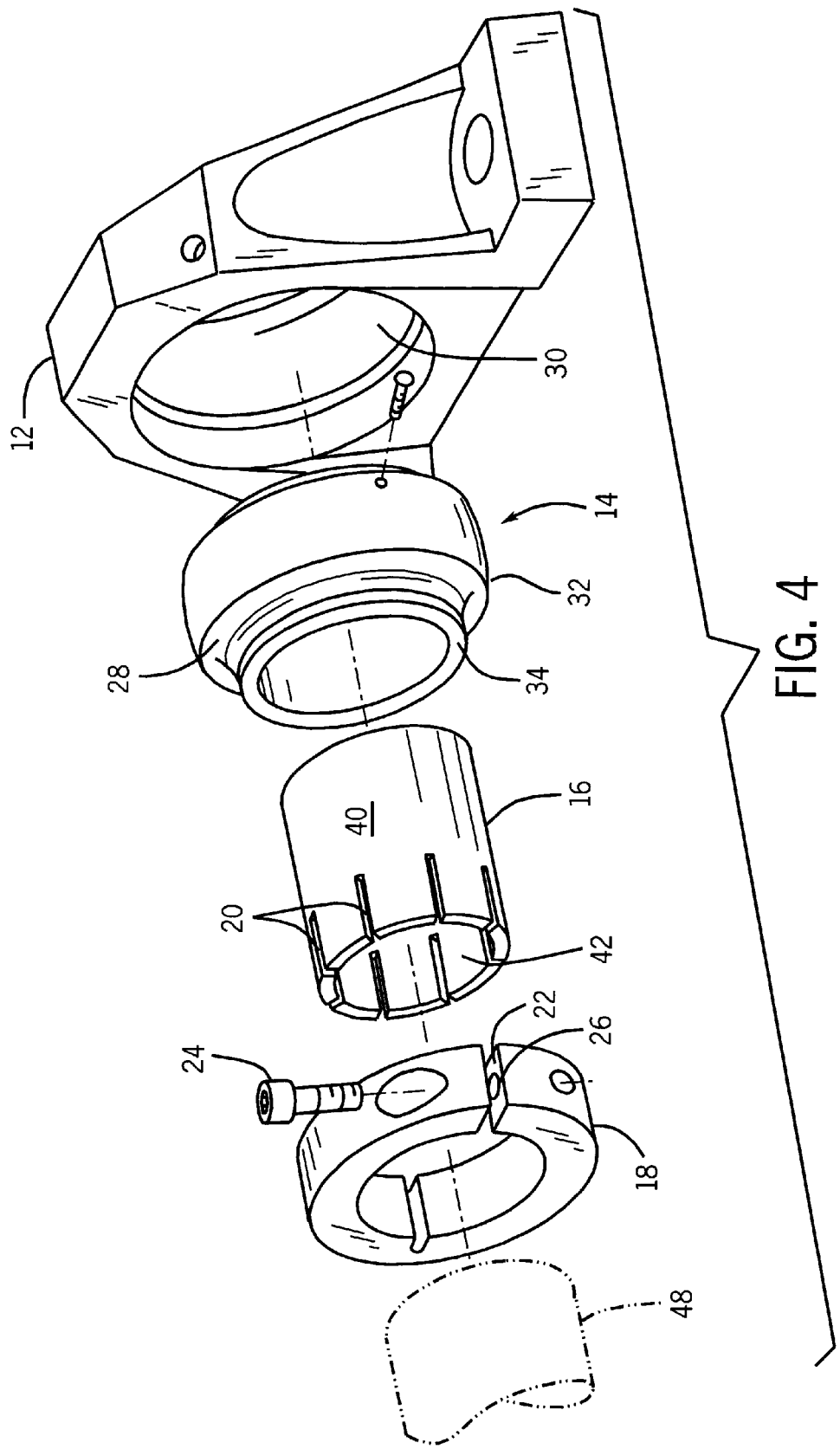
FIG. 4 is an exploded view of the system illustrating the various components prior to assembly.

FIG. 4 illustrates the foregoing components in an exploded view. As noted above, the assembly includes a housing 12 in which a bearing set 14 is positioned. Axial misalignment of a rotating member 48 may be accomodated by a spherical interface between the housing 12 and the bearing set 14. The inner ring 16 is fitted within the bearing set, such that the outer surface 40 of the inner ring interfaces with the bearing set to provide the plain or sleeve bearing in the final assembly. Slits 20 in the inner ring 16 permit its radial contraction on a rotating member 48. The collar 18 serves both to secure the inner ring 16 to the rotating member, and to resist thrust loading on the rotating member by transfer of the loading to the bearing set and housing.

Referring still to FIG. 4, for assembly, the bearing set 14 is first placed within the housing 12. The inner ring 16 and collar 18 may then be fitted to the rotating member 48 by sliding the inner ring 16 on the rotating member and positioning the collar on the extremity of the inner ring in which the slits 20 are formed. With the rotating member 48 in the proper position, then, the inner ring 16 and collar 18 are moved axially into a desired location, such as to afford the proper thrust abutment of the collar 18 against the bearing set 14 and described above. Fastener 24 is then secured within the collar 18 to span the split 22. The fastener is tightened within a threaded aperture 26 provided for that purpose to contract the collar 18 into ring 16 tightly on the rotating member 48.

During service, inner ring 16 and collar 18 rotate with member 48. Any wear, fretting, or other degradation in the system is primarily concentrated at inner ring 16, with some wear being possible within bearing set 14. However, significant wear will not occur on the rotating member 48. Thus, should wear occur, the inner ring 16, and where necessary the bearing set 14, may be replaced without replacement or even removal of the rotating member 48.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A bearing assembly comprising:
   a sleeve bearing set having a housing and an inner sleeve, the inner sleeve having a central aperture forming a first bearing surface and a thrust surface;
   an inner ring configured, to fit within the inner sleeve, the inner ring having an outer second bearing surface configured to bear against the first bearing surface to support the inner ring rotationally with respect to the inner sleeve, the inner ring having an inner surface configured to receive a mechanical member; and
   a collar configured to be fitted to the inner ring adjacent to the bearing set to secure the inner ring to the mechanical member and thereby to prevent relative movement between the inner ring and the mechanical member, the collar being configured to abut the thrust surface to transfer thrust loading from the mechanical member and inner ring to the bearing set.

2. The bearing assembly of claim 1, wherein the inner ring includes a plurality of longitudinal slits permitting radial contraction of the inner ring on the mechanical member.

3. The bearing assembly of claim 2, wherein the collar is configured to be fitted over a portion of the longitudinal slits to contract the inner ring on the mechanical member when installed thereon.

4. The bearing assembly of claim 1, wherein the collar has a ring configuration including a radial split, and wherein the collar is secured to the inner ring by a fastener received within the collar and spanning the split.

5. The bearing assembly of claim 1, wherein the inner sleeve is made of a polymeric material.

6. The bearing set of claim 1, wherein the thrust surface is formed on an annular extension of the inner sleeve between the collar and the housing.

7. The bearing assembly of claim 1, further comprising a bearing housing supporting the bearing set.

8. The bearing assembly of claim 7, wherein the bearing housing includes an inner support surface and the bearing set is mounted within the inner support surface so as to accommodate axial misalignment of the bearing set when installed on the mechanical member.

9. The bearing assembly of claim 1, wherein the inner ring is made of a stainless steel.

10. A bearing assembly comprising:
    a sleeve bearing set having a housing and a polymeric inner sleeve, the inner sleeve having a central aperture forming a first bearing surface;
    an inner ring configured to fit within the inner sleeve, the inner ring having an outer second bearing surface configured to bear against the first bearing surface to support the inner ring rotationally with respect to the inner sleeve, the inner ring having an inner surface configured to receive a mechanical member; and
    a collar configured to be fitted to the inner ring adjacent to the bearing set to secure the inner ring to the mechanical member and thereby to prevent relative movement between the inner ring and the mechanical member.

11. The bearing assembly of claim 10, wherein the collar has a ring configuration including a radial split, and wherein the collar is secured to the inner ring by a fastener received within the collar and spanning the split.

12. The bearing assembly of claim 10, further comprising a polymeric bearing housing supporting the bearing set.

13. The bearing assembly of claim 12, wherein the bearing housing includes an inner support surface and the bearing set is mounted within the inner support surface so as to accommodate axial misalignment of the bearing set when installed on the mechanical member.

14. The bearing assembly of claim 10, wherein the inner sleeve includes a thrust surface, and wherein the collar is configured to abut the thrust surface to transfer thrust loading from the mechanical member and inner ring to the bearing set.

15. The bearing assembly of claim 14, wherein the thrust surface is formed on an annular extension of the inner sleeve between the collar and the housing.

16. The bearing assembly of claim 10, wherein the inner ring includes a plurality of longitudinal slits permitting radial contraction of the inner ring on the mechanical member.

17. The bearing assembly of claim 16, wherein the collar is configured to be fitted over a portion of the longitudinal slits to contract the inner ring on the mechanical member when installed thereon.

18. A bearing assembly comprising:
    a sleeve bearing set having a housing and an inner sleeve, the inner sleeve having a central aperture forming a first bearing surface and an annular thrust extension bearing axially against the housing;
    an inner ring configured to fit within the inner sleeve, the inner ring having an outer second bearing surface configured to bear against the first bearing surface to support the inner ring rotationally with respect to the inner sleeve, the inner ring having an inner surface configured to receive a mechanical member; and
    a collar configured to be fitted to the inner ring adjacent to the thrust extension to secure the inner ring to the mechanical member and thereby to prevent relative movement between the inner ring and the mechanical member, and to transfer thrust loading on the mechanical member to the bearing set via the thrust extension.

19. The bearing assembly of claim 18, wherein the inner sleeve is polymeric.

20. The bearing assembly of claim 19, further comprising a polymeric bearing housing supporting the bearing set.

21. The bearing assembly of claim 20, wherein the bearing housing includes an inner support surface and the bearing set is mounted within the inner support surface so as to accommodate axial misalignment of the bearing set when installed on the mechanical member.

22. A bearing assembly comprising:
    a sleeve bearing set having a housing and a polymeric inner sleeve, the inner sleeve having a central aperture forming a first bearing surface and an annular thrust extension bearing axially against the housing;

a polymeric bearing housing supporting the bearing set;

an inner ring configured to fit within the inner sleeve, the inner ring having an outer second bearing surface configured to bear against the first bearing surface to support the inner ring rotationally with respect to the inner sleeve, the inner ring having an inner surface configured to receive a mechanical member; and a collar configured to be fitted to the inner ring adjacent to the thrust extension to secure the inner ring to the mechanical member and thereby to prevent relative movement between the inner ring and the mechanical member, and to transfer thrust loading on the mechanical member to the bearing set via the thrust extension.

23. The bearing assembly of claim 22, wherein the inner ring includes a plurality of longitudinal slits permitting radial contraction of the inner ring on the mechanical member.

24. The bearing assembly of claim 22, wherein the bearing housing includes an inner support surface and the bearing set is mounted within the inner support surface so as to accommodate axial misalignment of the bearing set when installed on the mechanical member.

25. The bearing assembly of claim 24, wherein the collar is configured to be fitted over a portion of the longitudinal slits to contract the inner ring on the mechanical member when installed thereon.

26. The bearing assembly of claim 22, wherein the inner ring is made of stainless steel.

27. A kit for securing a sleeve bearing assembly to a mechanical member, the sleeve bearing assembly including a housing, the kit comprising:

an inner sleeve comprising:
 a central aperture forming a first bearing surface; and
 an annular thrust, extension bearing axially against the housing;

an inner ring configured to fit within the inner sleeve, the inner ring having an outer second bearing surface configured to bear against the first bearing surface to support the inner ring rotationally with respect to the inner sleeve, the inner ring having an inner surface configured to receive a mechanical member; and a collar configured to be fitted to the inner ring adjacent to the bearing assembly and thereby to prevent relative movement between the inner ring and the mechanical member, wherein the collar is further configured to contact the thrust extension to secure the inner ring to the mechanical member to transfer thrust loading on the mechanical member to the bearing set via the thrust extension.

28. The kit of claim 27, wherein the inner ring includes a plurality of longitudinal slits permitting radial contraction of the inner ring on the mechanical member.

29. The kit of claim 28, wherein the collar is configured to be fitted over a portion of the longitudinal slits to contract the inner ring on the mechanical member when installed thereon.

30. The kit of claim 29, wherein the collar has a ring configuration including a radial split, and wherein the collar is secured to the inner ring by a fastener received within the collar and spanning the split.

31. A bearing assembly comprising:

a sleeve bearing set having a housing and an inner sleeve, the inner sleeve having a central aperture forming a first bearing surface, wherein the inner sleeve is made of a polymeric material;

a stainless steel inner ring configured to fit within the inner sleeve, the inner ring having an outer second bearing surface configured to bear against the first bearing surface to support the inner ring rotationally with respect to the inner sleeve, the inner ring having an inner surface configured to receive a mechanical member; and a collar configured to be fitted to the inner ring adjacent to the bearing set to secure the inner ring to the mechanical member and thereby prevent relative movement between the inner ring and the mechanical member.

32. The bearing assembly of claim 31, further comprising a polymeric bearing housing supporting the bearing set.

33. The bearing assembly of claim 31, wherein the inner sleeve includes a thrust bearing surface, and wherein the collar is configured to abut the thrust surface to transfer thrust loading from the mechanical member and the inner ring to the bearing set.

34. The bearing assembly of claim 33, wherein the thrust surface is formed on an annular extension of the inner sleeve between the collar and the housing.

35. The bearing assembly of claim 31, wherein the inner ring includes a plurality of longitudinal slots permitting radial contraction of the inner ring on the mechanical member.

36. The bearing assembly of claim 35, wherein the collar is configured to be fitted over a portion of the longitudinal slits to contract the inner ring on the mechanical member when installed thereon.

* * * * *